United States Patent [19]

Edwards

[11] 4,017,285
[45] Apr. 12, 1977

[54] HEAT PUMP-REFRIGERATION SYSTEM WITH WATER INJECTION AND REGENERATIVE HEAT EXCHANGER

[75] Inventor: Thomas C. Edwards, Oviedo, Fla.

[73] Assignee: The Rovac Corporation, Rockledge, Fla.

[22] Filed: Oct. 30, 1975

[21] Appl. No.: 627,114

[52] U.S. Cl. .................................. 62/2; 62/402; 418/13
[51] Int. Cl.² ........................................ F25B 13/00
[58] Field of Search ............... 62/2, 402, 324, 87; 418/100, 13

[56] References Cited

UNITED STATES PATENTS

| 2,704,925 | 3/1955 | Wood | 62/172 |
|---|---|---|---|
| 2,969,637 | 1/1961 | Rowekamp | 62/2 |
| 3,686,893 | 8/1972 | Edwards | 62/402 |

Primary Examiner—William E. Wayner
Attorney, Agent, or Firm—Leydig, Voit, Osann, Mayer & Holt, Ltd.

[57] ABSTRACT

An air conditioning system for a living space capable of operating as a heat pump or refrigerator employing a unitary compressor and expander having a common rotor with vanes defining enclosed compartments for positive compression of air in the compressor and positive expansion of air in the expander. A regenerative heat exchanger having thermally coupled air passages is employed in the system together with a non-regenerative primary heat exchanger which is located in the warm space. Air from the cool space is heated in the first passage of the regenerative heat exchanger, and moisture is injected, following which the air passes into the compressor inlet port. From the compressor outlet port wet air flows at high temperature and pressure to the primary heat exchanger located in the warm space where some of its heat is given up. Next the air flows through the second passage in the regenerative heat exchanger where its temperature is further lowered prior to being fed to the expander inlet port. Air from the expander outlet port, at low temperature and at atmospheric pressure, is discharged into the cool space, the net result being to increase the temperature differential between the spaces. When the system is used in the heat pump mode, the primary heat exchanger is located in the living space for heating the same, with the compressor-expander, initial air inlet, and final air outlet being located in the outside environment. In the preferred form of the invention a separate primary heat exchanger is located in the outside environment and transfer valves are provided to substitute the outside heat exchanger and for switching the initial air inlet and final air outlet into the living space for use of the system in the refrigeration mode. In an alternate form of the invention an auxiliary non-regenerative heat exchanger may be interposed between the final air outlet and initial air inlet. When the system is employed in the heat pump mode, provision is made for use of a solar heat absorber between the regenerative heat exchanger and the inlet port of the compressor.

8 Claims, 9 Drawing Figures

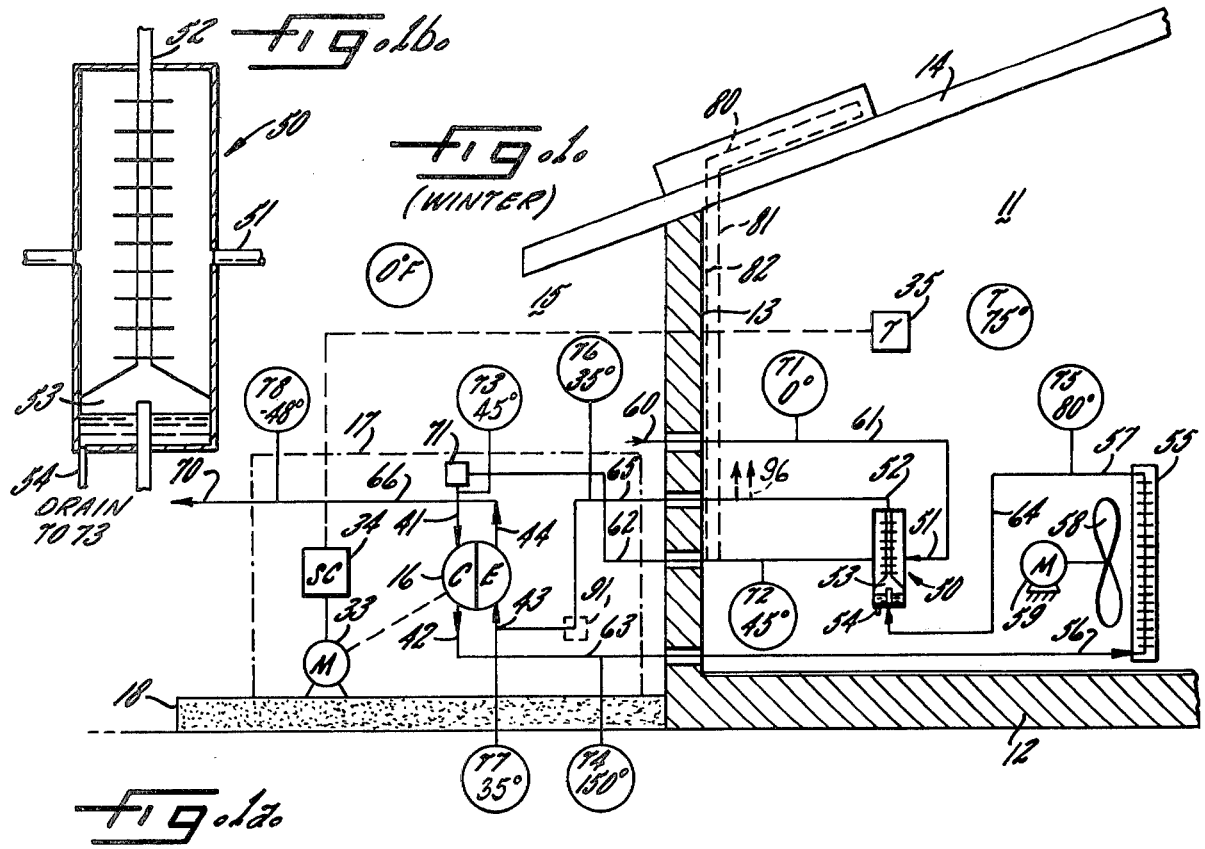
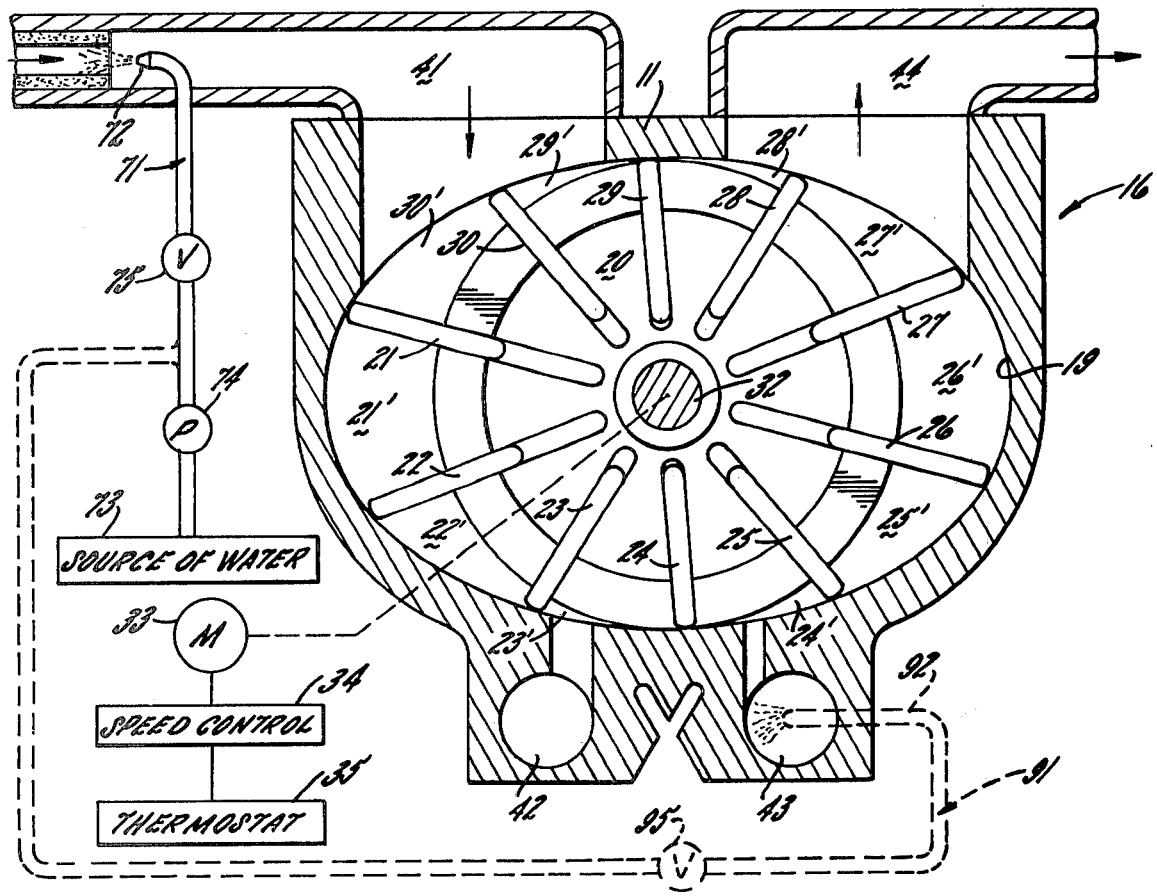

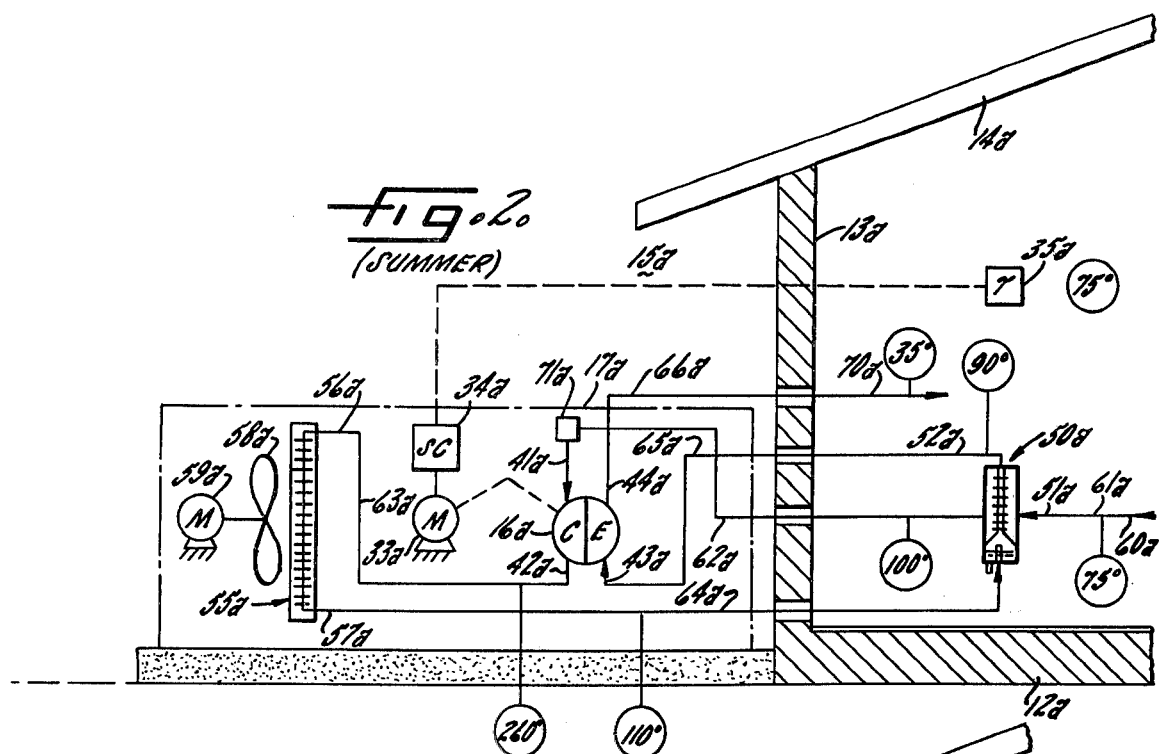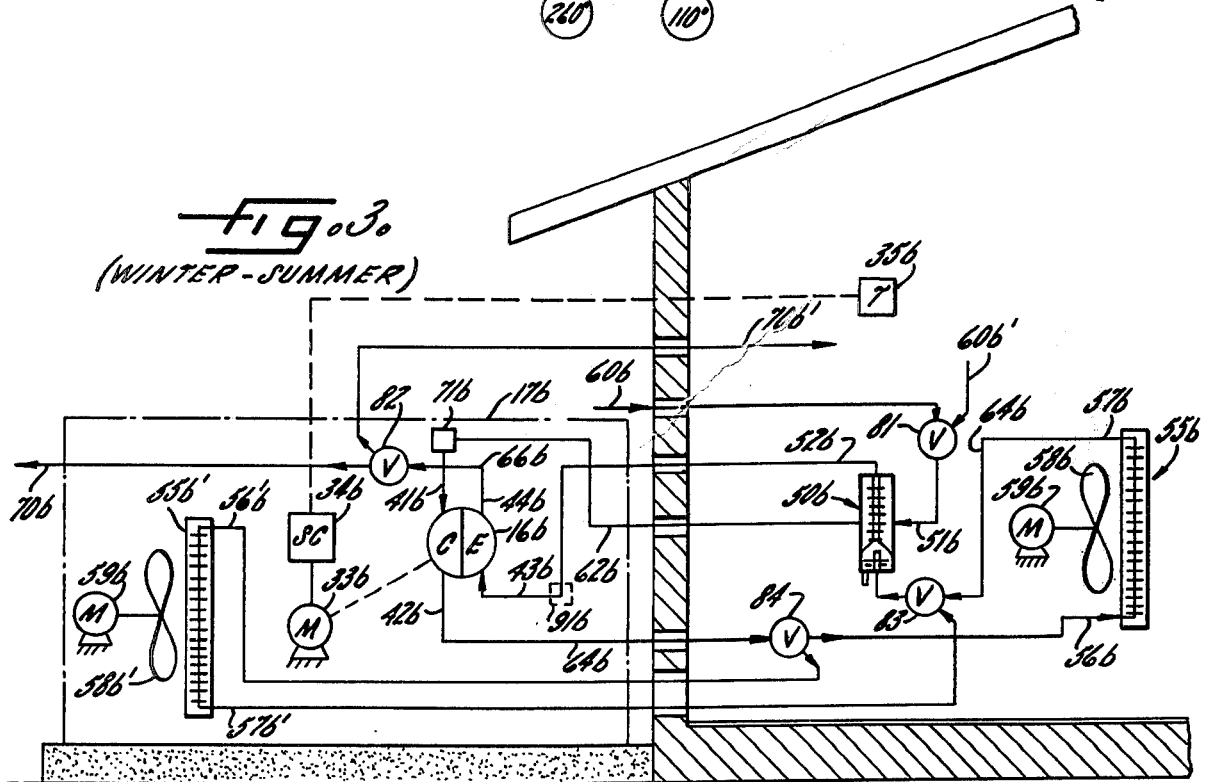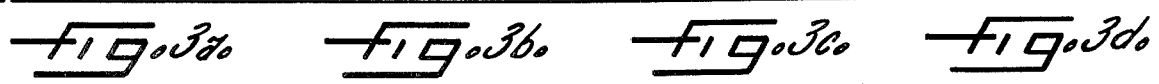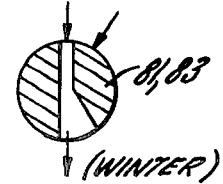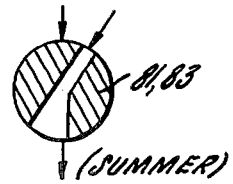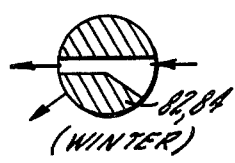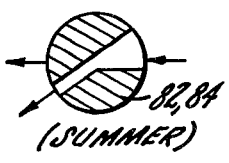

HEAT PUMP-REFRIGERATION SYSTEM WITH WATER INJECTION AND REGENERATIVE HEAT EXCHANGER

While heat pumps driven from the regular AC supply line are efficient and economical in a moderate climate, where there is only limited temperature differential between the living space and the outside ambient, conventional heat pump systems have a poor coefficient or performance and are expensive in terms of electrical energy in a colder climate where the outside temperature may drop to zero or below.

Accordingly, it is an object of the present invention to provide an air conditioning heat pump-refrigeration system which may be employed for both heating aand cooling a living space and which has a coefficient of performance both in the heating and cooling mode which exceeds that of more conventional systems. It is a more specific object of the invention to provide a heat pump system having a high coefficient of performance in even the coldest climates with outside temperatures going into the sub-zero range.

It is a further object of the invention to provide an all season air conditioning system having an inherently high heat capacity, and which may be constructed in a size capable of heating or cooling an entire house at an initial cost which is less than that of conventional air conditioners capable of operating in both heating and cooling modes. Installation is similarly economical.

Other objects and advantages of the invention will become apparent upon reading the attached detailed description and upon reference to the drawings, in which:

FIG. 1 is a diagram showing a system embodying the present invention operating in the heat pump mode;

FIG. 1a is a cross sectional view of the compressor-expander used in the system of FIG. 1;

FIG. 1b is a diagrammatic cross section of the regenerative heat exchanger employed in FIG. 1;

FIG. 2 shows a system for practicing the invention on the refrigeration mode;

FIG. 3 shows a system capable of operation in either the heat pump or refrigeration mode; and FIGS. 3a, 3b and 3c, 3d are diagrams showing the transfer valves of FIG. 3 in alternate positions.

While the invention has been illustrated and described in connection with certain preferred embodiments, it will be understood that I do not intend to be limited thereto but intend, on the contrary, to cover the various alternative forms of the invention which are included within the spirit and scope of the appended claims.

Turning now to the drawings there is shown in FIG. 1 a living space 11, typically a house having a foundation 12, insulated side wall 13 and insulated roof 14, all constructed to reduce heat loss to the outside environment 15. In the discussion which follows it will be assumed that it is desired to maintain a temperature of 75° F. within the living space while the temperature outside is 0° F.

The heart of the present air conditioning system is a compressor-expander 16 which may be mounted in an enclosure 17 supported outside of the house upon a suitable concrete slab 18.

As shown in FIG. 1a, the compressor-expander 16 has a chamber 19 oval configuration. It will be understood that the chamber is enclosed, at its ends, with parallel end members which are not shown but which are described in prior U.S. Pat. No. 3,904,327, which issued Sept. 9, 1975. Rotatable within the chamber is a rotor 20 having radially extending slidable vanes which may, for example, be ten in number and which have been designated 21–30, inclusive. The rotor has a shaft 32 which is journalled in bearings (not shown) mounted in the respective end members, the shaft being connected to a driving motor 33. The speed may be on the order of 1750 rmp. with on-off control. Where it is desired to control the temperature of the living space more precisely, the speed of the motor may be correctively modulated by a speed varying circuit 34 in accordance with a signal derived from a thermostat 35.

The vanes are all pressed outwardly, in their respective slots, by centrifugal force to form enclosed compartments 21'–30', respectively, which cylically undergo a decrease and then an increase in volume as the rotor rotates. The vanes are preferably guided in their inward and outward movements by providing each of the vanes with rollers rolling in a cam track as disclosed in U.S Pat. No. 3,904,327.

Assuming that the rotor turns in the direction shown by the arrows, the left-hand half of the device acts as a positive displacement compressor having an inlet port 41 and an outlet port 42, while the right-hand side acts as a positive displacement expander having an inlet port 43 and an outlet port 44.

In carrying out the present invention both a regenerative type heat exchanger and non-regenerative, or primary, heat exchanger are used. The regenerative heat exchanger indicated at 50 has a first air passage 51 and a second air passage 52, the two passages being thermally coupled. It will be understood that the details of the heat exchanger are outside of the scope of the present invention and it will suffice to say that cool air flowing through the first passage 51 receives heat from relatively warmer air flowing through passage 52, without any mixing of the air in the two passages. In addition, provision is made for draining any water which may condense in the passage 52 into a sump 53 connected to a drain line 54.

The non-regenerative heat exchanger, indicated at 55, which heats the living space, has an inlet 56 and an outlet 57 for conducting air at relatively high temperature. Transfer of the heat from the conducted air is facilitated by a fan 58 driven by a motor 59. Air enters the system through an initial air inlet 60 located in the outside ambient and which feeds air through a line 61 into the first passage 51 of the regenerative heat exchanger. From the regenerative heat exchanger air is fed through a line 62 to the inlet port 41 of the compressor. In the compressor the air is compressed and elevated in temperature for discharge at the compressor outlet port 42 which is connected via a line 63 to the inlet 56 of the non-regenerative heat exchanger 45, where a portion of the heat is subtracted from the air and transferred into the living space as indicated by the arrow.

The air flowing from the exit 57 flows into the second passage 52 of the regenerative heat exchanger via line 64 and thence via a line 65 to the inlet port 43 of the expander. From the expander outlet port 44 the air flows through a line 66 to the final air outlet 70 where the air is discharged at a temperature lower than ambient.

In accordance with one of the important features of the present combination, means are provided for injecting water, in finely divided form, into the air stream which enters the compressor. The injecting means, indicated at 71 may be located anywhere in the line 62 which interconnects the regenerative heat exchanger with the compressor inlet port; however, it is convenient to use a water injection nozzle 72 which is located at the inlet port 41 (FIG. 1a), the nozzle being supplied from a suitable source of water 73 via a pump 74 and throttle valve 75, the valve being adjusted by manual or automatic means, well within the skill of the art, to provide a flow on the order of 100–500 grains of liquid water per pound of dry air. Preferably the amount of water which is added is enough to supersaturate the air which enters the compressor. The result is to increase the volumetric heat capacity of the medium flowing into the compressor while reducing the temperature of the medium exiting from the compressor to a level lower than that which would obtain in the dry state, thereby reducing the work required to compress the air and consequently the work required to drive the rotor. In short, the work of compression is reduced, resulting in a reduced load upon the driving motor 33. Moreover, the injection of water into the airstream at the compressor insures saturation of the air which enters the expander, the resulting condensation of such water, occurring during the expansion process, serving to increase the temperature of the exiting air by release of the heat of vaporization thereby increasing the work of expansion which serves to drive the shaft 32 and which, therefore, further reduces the loading upon the motor 33. For a more detailed discussion of the phenomena of water injection reference is made to my copending application Ser. No. 559,063 filed Mar. 17, 1975.

While the operation of the disclosed device will be apparent in light of the diagram in FIG. 1, the operation may be reviewed in the light of practical achievable temperatures, the temperatures being shown by the encircled numerals in the figure. Thus air at the 0° F. enters through the initial air inlet 60. The air, at 0° F., flowing through the first passage 51 of the regenerative heat exchanger sustains an increase in temperature from 0° to 48° F., the increase resulting from the heat transferred from the stream of air flowing through the second passage 52. Air from the passage 51, at its augmented temperature, is particularly efficient in the taking on of water from the spray nozzle 72 (see FIG. 1a). The air, with its injected water, passing through the compressor side of the compressor-expander is both compressed, at a compression ratio which may be on the order of 2.75 to 1, and elevated in temperature to a temperature which may be on the order of 150° F. The compressed and heated air, with the moisture therein largely in vapor state, passes into the primary heat exchanger 55 where heat is subtracted and transferred to the living space by the action of fan 58, the air in the stream being reduced thereby to a temperature on the order of 80° F. Such air is conducted via line 65 to the second passage 52 in the heat exchanger, where the temperature is further reduced to about 35° F. and where the water largely condenses out collecting in the sump 53 for return, through drain line 54, to the source of water 73.

The air, exiting at substantially 45° F. from the passage 52 travels, via line 65, into the expander inlet port 43, where the air is expanded at a ratio of approximately 1 to 3 resulting in a sudden drop in pressure to the atmospheric level with a lowering of the temperature to substantially below zero, for example, to −48° F. The temperature of the exiting air is, however, higher than would obtain in the absence of water vapor because of the heat given off in the process of condensation thereby increasing the work of expansion. As stated, such work is usefully recovered serving to drive the shaft of the device and thus reducing the loading upon the drive motor.

The water, in addition to improving heat capacity and efficiency preferably carries a small percentage of miscible lubricant for lubricating the vane surfaces thereby reducing the coefficient of friction and lowering the amount of energy which is lost in the compressor-expander in the form of heat. The lubricant may for example, be in the form of a lubricating oil in colloidal suspension using a suitable emulsifying agent, such as Oxford Coolex, plus an anti-corrosion agent.

It is found that unusual efficiency is achieved in the above described system. This may be demonstrated by a calculation of coefficient of performance based upon computer data under the following conditions:

$P_{ATM}$ = 14.7 psia
$T_1$ (Outside) = 0° F.
$T$ (Inside) = 75° F.

$T_2$ = 48° F.
$T_3$ = 45° F.
$T_4$ = 150° F.
$T_5$ = 80° F.
$T_6$ = 38° F.

$T_7$ = 35° F.
$T_8$ = −48° F.

$\Delta P_{HX}$ = 1.5 psi.

Pressure Ratio = 2.75
Compressor Polytropic
    Index = 1.20 (wet)

Expander Polytropic
    Index = 1.25 (wet)
Coefficient of Sliding
    Friction = 0.02 (water/lube mix)
$h_4$ = 57.91 BTU/lbm
$h_5$ = 28.0 BTU/lbm air (Garrett Tables)
M = 7.55 lbm/min flow rate
$HP_{req}$ = 1.128
Compressor Efficiency
    adiabatic = 95.78%
    overall = 94.07%
Expander Efficiency
    adiabatic = 97.13%
    overall = 95.19%

The Coefficient of Performance by defnition is:

$$COP = \frac{\dot{Q}}{HP} = \frac{M(h_4 - h_5)}{HP_{req}}$$

Substituting obtained values:

$$COP = \frac{(7.55)(60)(57.91 - 28.0)}{1.128 \times 2545}$$

-continued $$COP = \frac{13549}{2870} = 4.75$$

This is an exceptionally high level of coefficient considering the large differential of temperature between the living space and outside ambient. While the figure of 4.72 may not be obtainable in all systems constructed in accordance with the present invention, because of varying conditions including varying amounts of friction either in the machine or by reason of the diameter of the air lines which are employed, it should be readily possible, in practical case, to achieve a coefficient of performance of at least 3. This is not only greater than the coefficient of performance normally obtained with a heat pump, but heat pumps of conventional design will usually fail to perform entirely when the temperature differential is large.

A still further increase in efficiency in the heat pump mode may be achieved by employing, on the roof of the building, a solar heat absorber 80 having an input line 81 and an output line 82 and which may be effectively interposed in series with the line 62 which connects the regenerative heat exchanger with the inlet port of the compressor, all as illustrated by the dotted lines in FIG. 1. Where a solar absorber is used, automatic means is preferably employed for cutting the solar absorber into the system only when the temperature at the absorber is higher than the temperature which would normally exist in the line 62.

While the system has been described in connection with its function as a heat pump, it is capable of serving as an efficient summer refrigeration system as set forth in FIG. 2, where similar reference numerals have been employed to designate similar elements, with addition of subscript $a$, and with typical values of temperature at the various points in the system indicated by the encircled numerals. By comparing FIGS. 1 and 2 it will be noted that the circuit is the same and that the the circuit is the same and that the only difference is that the primary heat exchanger has been moved out of doors while the initial air inlet 60$a$ and final air outlet 70$a$ have been moved indoors.

As a refrigeration system, and assuming indoor and outdoor temperatures of 75° and 100° F., the operation is as follows: Indoor air at 75° F. is conducted through the first passage 51$a$ of the regenerative heat exchanger, with its temperature being thereby raised to a level on the order of 100° F. The heated air is fed into the compressor inlet port 41$a$ where it picks up water and emerges, at the compressor outlet port 42$a$, at a temperature of approximately 260° F. Such air is directed into the primary heat exchanger 55$a$, emerging from the outlet port 57$a$ at a temperature on the order of 110° F., the air being then fed through the second passage 52$a$ of the regenerative heat excchanger so that its temperature is dropped to about 90° F. The air at 90° F. is then fed into the inlet port 43$a$ of the expander, emerging from the final air outlet 70$a$ at a temperature on the order of 35° F. As in the heat pump embodiment, a thermostat 35$a$ may be employed to control the temperature, responding to demand with simple on-off action, or to modulate a speed control circuit 34$a$ so that the motor 33$a$ operates the compressorexpander at a speed which is tailored to need.

With the operation of the system in its heat pump and refrigeration modes understood, it will be apparent that it is highly practical to use the same system for both purposes, switching from one mode to the other by a set of transfer valves. Thus referring to FIG. 3, which shows a combined winter-summer system, corresponding reference numerals have been utilized to indicate corresponding elements, with addition of subscript $b$. In addition to the primary heat exchanger 55$b$ which is located indoors, an alternate, primary heat exchanger 55$b'$ is provided having a fan 58$b'$ and a drive motor 59$b'$. Moreover, an alternate initial air inlet 60$b'$ and an alternate initial air outlet 70$b'$ are located indoors. A first set of transfer valves 81, 82 are used to switch the air inlet and air outlet to "inside" positions, FIGS. 3$a$ and 3$b$ showing the valve 81 in its winter and summer positions. Similarly, FIGS. 3$c$ and 3$d$ show the valve 82 in its winter and summer positions. Transfer valves 83, 84, which are of respectively similar construction, serve to switch the system from the indoor primary heat exchanger 55$b$, which is effective in winter for heat pump useage, to the outdoor heat exchanger 55$b'$, which is effective in summer for refrigeration useage. It will be apparent to one skilled in the art that all of the transfer valves 81–84 may be coupled together for shifting by a common operator to establish the two modes of use and such operator may be employed, in addition, to invert the function of the thermostat 35 to produce greater speed at the compressor-expander with an increase in room temperature as required for summertime control.

While the system has been described, in its two modes, in connection with heating and cooling of a single room it will be understood by one skilled in the art that the unit may serve to cool a house of many rooms by ducting the output air from the heat exchanger 55$b$ and by similarly ducting the air from the final air outlet 70$b'$, with the flow from the latter being assisted by an induction fan, the same fan 58$b$ being preferably employed, as shown, both winter and summer, for this purpose.

In the system as thus far described, water is injected at one position in the circuit, namely, at the input port 41 of the compressor. However, it is one of the features of the invention that the work of expansion may be even more completely recovered, and the load upon the drive motor reduced, for a further increase in coefficient of performance by injecting additional water, in finely divided form into the air stream entering the expander inlet port. Such water may for example be injected by injecting means 91 in the form of a spray nozzle 92 under the control of a throttle valve 95 coupled to the output of pump 74 as shown by the dotted lines in FIG. 1$a$. Such loading of the expanding air stream with liquid water, which may in a practical case be at the rate of 300 grains or more per pound of air, by liberating sensible heat, and heat or crystallization as the water freezes, causes the temperature of the air, really air-water (ice) mix, discharged at the expander outlet port to be somewhat higher than would otherwise be the case resulting in the increased work of expansion. However, it will be understood that adding water at the expander inlet will normally be reserved for the heat pump mode since the expanded air, in such mode is idly discharged into the atmosphere rather than into the living space.

The term "living space" is, however, to be broadly interpreted to include any space which is to be intentionally heated or cooled, including, for example, an automobile, in which case the moisture added at the expander inlet may not be objectionable in summertime use, or a processing or storage space.

While water will normally be used as the additive because of its availability, high heat of vaporization, and high specific heat, it is contemplated that under some circumstances, as stated, a secondary heat exchanger will be connected directly between the initial air inlet and final air outlet, in which case a gas other than air and an additive other than water, but having similar characteristics, may be used; hence the terms air and water are to be broadly construed.

The term "vane" as used herein includes any means on the rotor defining compartments in which positive compression, or positive expansion takes place.

It is, finally, one of the features of the invention when operating the system in the winter as a heat pump, that a solar panel, similar to that shown at 80, may be interposed in line 65 ahead of the moisture injecting means 91 (FIGS. 1 and 1a) at 96 so that the air flowing through the injecting means, being at a higher temperature, will taken on (dissolve) additional water. The subsequent condensation of the additional water in the expander, by liberating heat, causes the air leaving the expander to be at a higher temperature, thereby increasing the recovered work of expansion which assists in driving the compressor side, resulting in a still further gain in the coefficient or performance.

I claim as my invention:

1. A heat pump-refrigeration system comprising, in combination, a cool space, a relatively warm space separated therefrom by an insulating barrier, a unitary compressor and expander having rotor means driven by a common shaft, the rotor means having vanes defining enclosed compartments which cyclically become smaller and larger as the shaft rotates, the compressor and expander each having an inlet port and an outlet port so that air is positively compressed and elevated in temperature in the compressor and positively expanded and lowered in temperature in the expander, a regenerative heat exchanger having first and second thermally coupled air passages, a primary heat exchanger in the warm space having an air passage thermally coupled to the air in the warm space, an initial air inlet for conducting air from the cool space into the first passage of the regenerative heat exchanger, means for conducting the air from said first passage to the compressor inlet port, means for conducting the air from the compressor outlet port to the primary heat exchanger, means for conducting the air from the primary heat exchanger to the second air passage of the regenerative heat exchanger, means for conducting the air from the said second air passage to the inlet port of the expander, and a final air outlet for conducting air from the outlet port of the expander to the cool space so that heat is effectively pumped from the cool space to the warm space to increase the temperature differential between them, and means for injecting water in finely divided form into the air stream which enters the compressor.

2. The combination as claimed in claim 1 in which a secondary heat exchanger is provided in the cool space having an air passage thermally coupled to the air in the cool space, the air passage being interposed between the final air outlet and the initial air inlet for recirculation of the air in the system.

3. The combination as claimed in claim 1 in which a small percentage of miscible lubricant is entrained in the water entering the compressor inlet port.

4. The combination as claimed in claim 1 in which the relatively warm space is a living space and in which a solar heat absorber having an air passage is interposed upstream of the compressor for furnishing solar-heated air thereto.

5. The combination as claimed in claim 4 in which the solar heat absorber is interposed between the regenerative heat exchanger and the inlet port of the compressor.

6. The combination as claimed in claim 1 in which additional means are provided for injecting liquid water in finely divided form into the airstream entering the expander inlet port.

7. The combination as claimed in claim 6 in which the relatively warm space is the living space and in which a solar heat absorber having an air passage is interposed upstream of the water injecting means at the expander inlet port so that additional water will be dissolved in the air entering the expander increasing the recovered work of expansion.

8. A heat pump-refrigeration system for a living space separated from the environment by an insulating barrier comprising, in combination, a unitary compressor and expander having rotor means driven by a common shaft, the rotor means having vanes defining enclosed compartments which cyclically become smaller and larger as the shaft rotates, the compressor and expander each having an inlet port and an outlet port so that air is positively compressed and elevated in temperature in the compressor and positively expanded and lowered in temperature in the expander, a regenerative heat exchanger having first and second thermally coupled air passages, a primary heat exchanger in the living space having an air passage, an initial air inlet for conducting air from the environment into the first air passage of the regenerative heat exchanger, means for conducting the air from said first passage to the compressor inlet port, means for conducting the air from the compressor outlet port to the primary heat exchanger, means for conducting the air from the primary heat exchanger to the second air passage of the regenerative heat exchanger, means for conducting the air from the said second air passage to the inlet port of the expander, a final air outlet for conducting air from the outlet of the expander to the environment so that heat is effectively pumped from the environment to the living space to increase the temperature of the living space, means for injecting water in finely divided form into the airstream entering the compressor, an alternate initial air inlet and an alternate finaal air outlet in the living space, an alternate primary heat exchanger in the environment, first transfer valve means for subsituting the alternate ones of the initial air inlet and final air outlet for communication with the living space, and second transfer valve means for substituting the alternate primary heat exchanger for effecting heat exchange with the environment, and means for simultaneously operating the valve means for refrigeration of the living space.

* * * * *